US007646874B2

(12) United States Patent
Iwamoto et al.

(10) Patent No.: US 7,646,874 B2
(45) Date of Patent: Jan. 12, 2010

(54) ESTABLISHING MUTUAL AUTHENTICATION AND SECURE CHANNELS IN DEVICES WITHOUT PREVIOUS CREDENTIALS

(75) Inventors: Neil Y. Iwamoto, Mission Viejo, CA (US); Royce E. Slick, Mission Viejo, CA (US); Craig Mazzagatte, Aliso Viejo, CA (US); Martin Martinez, Ladera Ranch, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 810 days.

(21) Appl. No.: 11/314,089

(22) Filed: Dec. 22, 2005

(65) Prior Publication Data

US 2007/0150420 A1 Jun. 28, 2007

(51) Int. Cl.
*H04L 9/08* (2006.01)
*H04L 9/00* (2006.01)
*G06Q 20/00* (2006.01)
*H04L 29/06* (2006.01)
*H04L 9/32* (2006.01)

(52) U.S. Cl. .................. 380/278; 380/277; 705/64; 705/71; 713/155; 713/171

(58) Field of Classification Search .................. 713/155, 713/171; 380/277, 278; 705/64, 71
See application file for complete search history.

(56) References Cited

U.S. PATENT DOCUMENTS 7,440,452 B1 * 10/2008 Giniger et al. .............. 370/389
2002/0004900 A1 * 1/2002 Patel ......................... 713/155
2003/0081788 A1 * 5/2003 Simpson et al. ............. 380/278
2004/0101141 A1 * 5/2004 Alve .......................... 380/278
2004/0255037 A1 * 12/2004 Corvari et al. .............. 709/229
2006/0031899 A1 * 2/2006 Rabin et al. ................. 725/104

* cited by examiner

*Primary Examiner*—Emmanuel L Moise
*Assistant Examiner*—Phy Anh Vu
(74) *Attorney, Agent, or Firm*—Fitzpatrick, Cella, Harper & Scinto (57) ABSTRACT

The invention provides for installing encryption keys on a device not having any previous security credentials. An installation authority generates a security token to be used by the device for secure communications, and an installation credential for the device, and stores them in association with one another. A user of the device is provided with the installation credential, whereby the user inputs the installation credential into the device. The device utilizes the installation credential as a temporary security key, establishes a secure communication channel with the installation authority and requests provision of the security token. The installation authority provides the security token associated with the installation credential to the device over the established secure communication channel, and the device installs the security token, after which the device erases the installation credential from the device. The installation authority may also certify the security token and provide a certified token and a root verification certificate to the device.

12 Claims, 9 Drawing Sheets

ESTABLISHING MUTUAL AUTHENTICATION AND SECURE CHANNELS IN DEVICES WITHOUT PREVIOUS CREDENTIALS

INCORPORATION BY REFERENCE

U.S. application Ser. No. 10/309,890 entitled "Encryption Key Generation In Embedded Devices", filed on Dec. 5, 2002 is incorporated by reference herein.

BACKGROUND OF THE INVENTION

1. Field of the Invention

The present invention relates to installing security items (e.g., encryption keys, device credentials, root verification certificates, etc.) on a device, such as a printer, that has no previous security credentials. More specifically, the present invention concerns a user inputting an installation credential issued by an installation authority into a device, whereby the device uses the installation credential to establish a temporary secure communication channel between the device and the installation authority so that the installation authority can provide the device with encryption keys, or so that the installation authority can certify a key generated within the device.

2. Description of the Related Art

Computer systems that communicate via secure channels are known. For example, it has been known to employ printers in a secure printing system so that the printer can receive and process encrypted print jobs. In communicating a secure print job to a printer, it has been known to use a public key infrastructure in which the print job is encrypted at the sending node using a public key of the printer, and then when the print job is received, the printer decrypts the print job using its private key.

In this type of system, on the sending node side, the printer's public key is typically obtained by the sending node and may be stored locally in the sending node, or may be obtained via a network from a source, including the printer itself, each time a print job is to be encrypted. On the printer side, the printer's private key, along with the public key, is generally installed and stored on the printer in a secure manner. Thus, in this type of system, it is necessary to install the keys on the printer in a secure manner.

One typical process is to install the keys on the printer during the manufacturing process. While this process has generally been known to work satisfactorily, it does nonetheless present some problems. Specifically, because the keys are generated and installed on the printer during the manufacturing process, the keys are exposed to potential hackers long before the printer is even put into service. For example, an individual at the printer manufacturing facility may be able to hack into the printer and obtain or corrupt the keys. While the manufacturers generally take steps to ensure security, it is nearly impossible to prevent all unauthorized activities. Additionally, any one of a number of delivery service men, wholesale or retail dealers, installers, etc. may be able to obtain or corrupt the keys before the printer is put into service. Thus, to prevent the foregoing key exposure, it would be more desirable to install the keys in the printer after the printer has been installed on a network.

Techniques for installing keys in the printer after the printer has been installed on the network are also known. One technique is for a certifying authority to provide the keys to the user on a separate medium, such as a floppy disk or a compact disc. Using this medium, the user can then install the keys on the printer after the printer has been installed on the network. However, this technique presents the possibility of the medium being intercepted by unauthorized personnel so that the keys can be obtained.

Another technique is for the printer to establish a secure connection with a certifying authority once the printer is installed on the network and for the certifying authority to download the keys to the printer for installation. While this technique addresses some of the foregoing concerns relating to the keys being installed on the printer during manufacturing, or the keys being provided on a separate medium, it nonetheless has some drawbacks. Specifically, in order for the printer to establish a secure, authenticated connection with a certifying authority so that keys can be downloaded and installed on the printer, the printer must already have some type of security credentials in order to establish a secure connection for the key download. Thus, like the above-described problems, the security credentials installed on the printer would be subject to the same security problems as keys installed on the printer in that a hacker could obtain the credentials and use them to obtain the keys. Therefore, what is needed is a way to establish a temporary secure channel between a printer and a certifying authority in order to authenticate a printer that does not have any credentials previously installed thereon so that security keys can be installed on the printer.

SUMMARY OF THE INVENTION

The present invention addresses the foregoing by providing a user of a device, such as a printer, not having any security credentials, with an installation credential that is to be input into the device. The installation credential, once input by the user into the device, is used by the device as a temporary security key to establish a secure channel of communication between the device and an installation authority (e.g., a server) so that encryption keys can be securely downloaded to the device.

In more detail, in one embodiment of the invention, a security token to be used by the device (e.g., a printer) for secure communications is generated by the installation authority (e.g., a server). For example, if the security token is an encryption keypair (e.g., public/private keypair of a PKI), the keypair is generated by the installation authority. The generated keypair is securely stored by the installation authority for later downloading to a device.

In this regard, for use in downloading the keypair, the installation authority also generates an installation credential for the device. The installation credential may be, for example, a barcode or an alphanumeric code that can be printed on paper, or any other type of information that a user can readily input into the device. Having generated the installation credential for the device, the installation authority associates the credential with the generated keypair. The user, or purchaser of the device, is then provided with the installation credential. For instance, the purchaser or an administrator may be provided with a printed document containing a barcode to be read by the device, or containing an alphanumeric code to be entered into the device.

Once the user connects the printer to a network, they can then install the encryption keys. To accomplish this according to one aspect of the invention, the user may select an option on the device, or may be prompted by the device, to perform security setup of the device. The user then inputs the installation credential into the device. For example, if the credential is printed on a sheet of paper, the user may scan in a barcode, or may enter an alphanumeric code on a keypad of the printer. The device, employing its embedded encryption/security capabilities, utilizes the input installation credential as an encryption key to establish a secure communication channel with the installation authority. For example, the device uses the installation key as a symmetric key for sending encrypted messages. The device then requests that the encryption keys be provided by the installation authority to the device. If the device is authenticated by the installation authority, the installation authority obtains the keys associated with the installation credential and provides the keys to the device using the installation key for encryption. The installation authority may also perform a certification process to, for example, certify a public key of the keypair and download the certified public key and a root verification certificate to the device. Once the device receives the keys, it performs an installation process to install them on the device. Finally, after having completed the installation process, the device terminates the secure communication and erases the installation key from the device.

As can readily be seen from the foregoing, a device without any previous security credentials can still establish a secure communication channel with an installation authority in order to download encryption keys by a user merely inputting an installation credential into the printer. Once the keys have been installed, the device is ready to perform secure communication operations with other devices.

Thus, in one aspect, the invention installs encryption keys on a device not having any previous security credentials by generating, by an installation authority, a security token to be used by the device for secure communications, and storing the generated security token by the installation authority. The installation authority also generates an installation credential for the device, and associates the installation credential generated for the device with the generated security token. A user of the device is provided with the installation credential. The user inputs the installation credential into the device, whereby, the device, utilizing the installation credential as a temporary security key for secure communications, establishes a secure communication channel with the installation authority and requests provision of the security token by the installation authority to the device. The installation authority provides the security token associated with the installation credential to the device over the established secure communication channel. The device performs an installation process to install the security token on the device, and after having completed the installation process, the device erases the installation credential from the device.

It should be known to those skilled in the art that the security key used for the secure communications may be derived from the installation credential in addition to using the installation credential as the security key directly.

In another, related aspect of the invention, although the encryption keys may be installed in the device during manufacturing, or may be generated within the device, the keys would need to be certified before the device could perform secure communications using the keys. To address this problem, similar to the foregoing aspect, the invention utilizes the installation credential as a temporary security key to establish a secure communication channel with the installation authority so that the keys can be certified. Thus, in the second aspect, the invention establishes security credentials for a device not having any previous security credentials by generating, in the device, the security token to be used by the device for secure communications, and storing the generated security token in the device. An installation authority generates an installation credential for the device, and provides a user of the device with the installation credential. The user inputs the installation credential into the device, whereby, the device establishes a temporary secure communication channel with the installation authority utilizing the installation credential as a temporary security key. The device provides the generated security token to the installation authority via the temporary secure communication channel. The device would then be able to communicate securely with the installation authority. However, the installation authority may perform a process to certify the security token, or obtain certification of the security token from an independent certifying authority, and provide a certified security token and a root verification certificate of the certifying authority to the device. The device terminates the temporary secure communication channel and erases the installation credential from the device.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENTS

Figure 1:
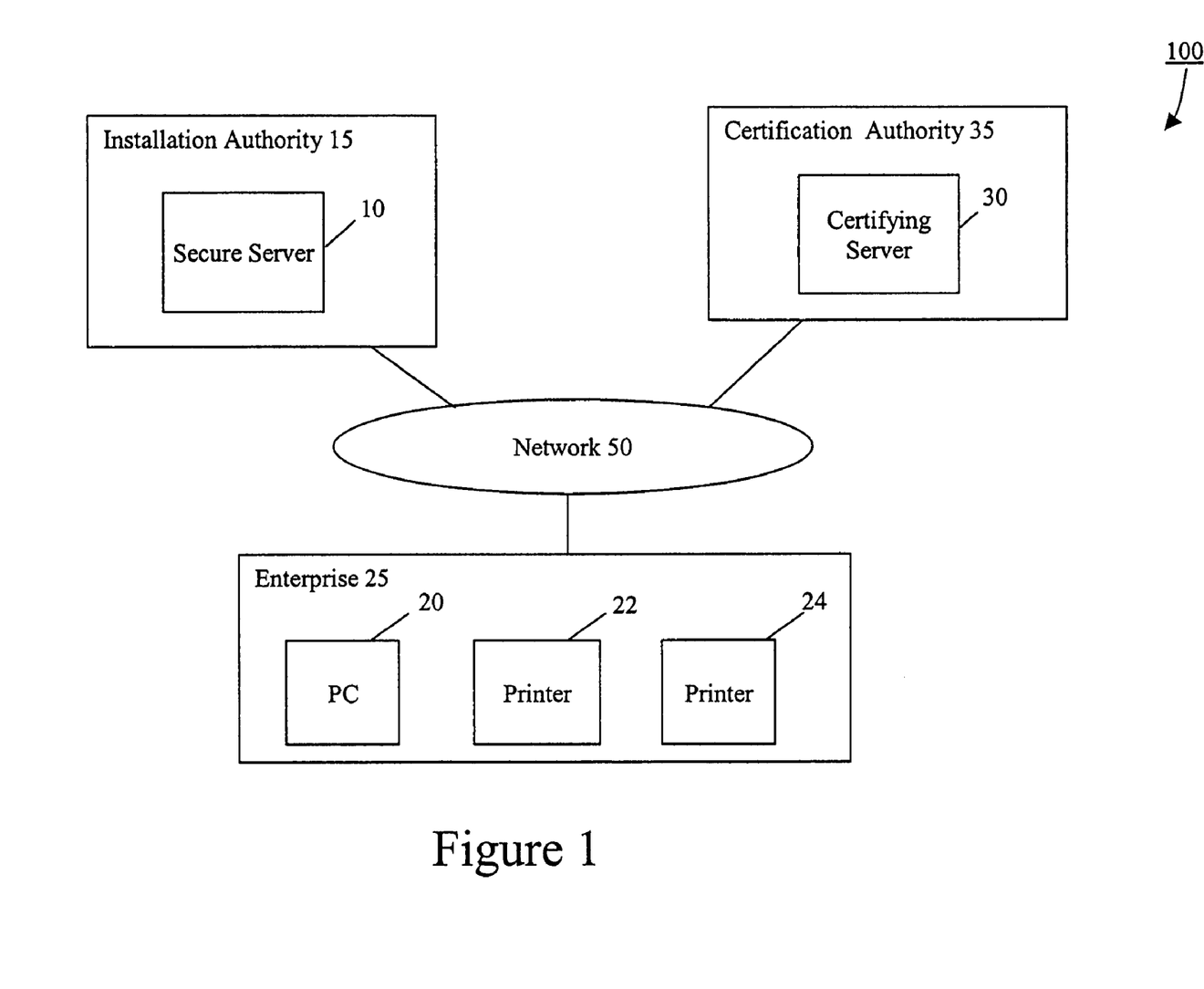
FIG. 1 provides an overall system view of a networked computing environment in which the present invention may be implemented.

FIG. 1 provides an overall system view of a networked computing environment 100 in which the present invention may be implemented. Although the following description focuses primarily on the networked computing environment 100 shown in FIG. 1, the present invention may be implemented in various alternative systems.

As shown in FIG. 1, the networked computing environment 100 preferably comprises a network 50 which connects installation authority 15, enterprise 25, and certification authority 35. Network 50 may be any type of network, such as a local area network (LAN), a wide area network (WAN), or the Internet. Thus, network 50 is preferably an Ethernet network medium consisting of a bus-type physical architecture, although the invention can be utilized over other types of networks. Enterprise 25 is shown in FIG. 1 as constituting a single location. However, the enterprise could be a company spanning multiple locations across the world, but for simplicity, only one location is shown in FIG. 1. Enterprise 25 is preferably a business office that includes a local area network (not shown) which connects multiple devices (e.g., printers, servers, personal computers, etc.) that communicate with one another, and along these lines, enterprise 25 is shown to include PC 20, and printers 22 and 24. The devices of enterprise 25 preferably include the ability to perform secure communications with one another, as well as with other devices connected to network 50. Thus, the present invention provides a way to establish the security capabilities of the devices shown in enterprise 25.

Installation authority 15 is preferably a location that manages security information for downloading to various devices connected to network 50, and along these lines, installation authority 15 is shown to include secure server 10, which will be discussed in more detail below. Similarly, certification authority 35 is preferably a location that may provide independent certification services to installation authority 15 in environment 100 via communication with installation authority 15, and along these lines, certification authority 35 is shown to include certifying server 30. It is noted that, while FIG. 1 shows separate authorities for the installation authority and the certification authority, those skilled in the art readily understand that the functions of each could be combined into a single location. That is, installation authority 15 may perform the certification function on its own. Alternatively, installation authority may obtain independent outside certification via communication with certifying authority 35, as shown in FIG. 1.

Figure 2:
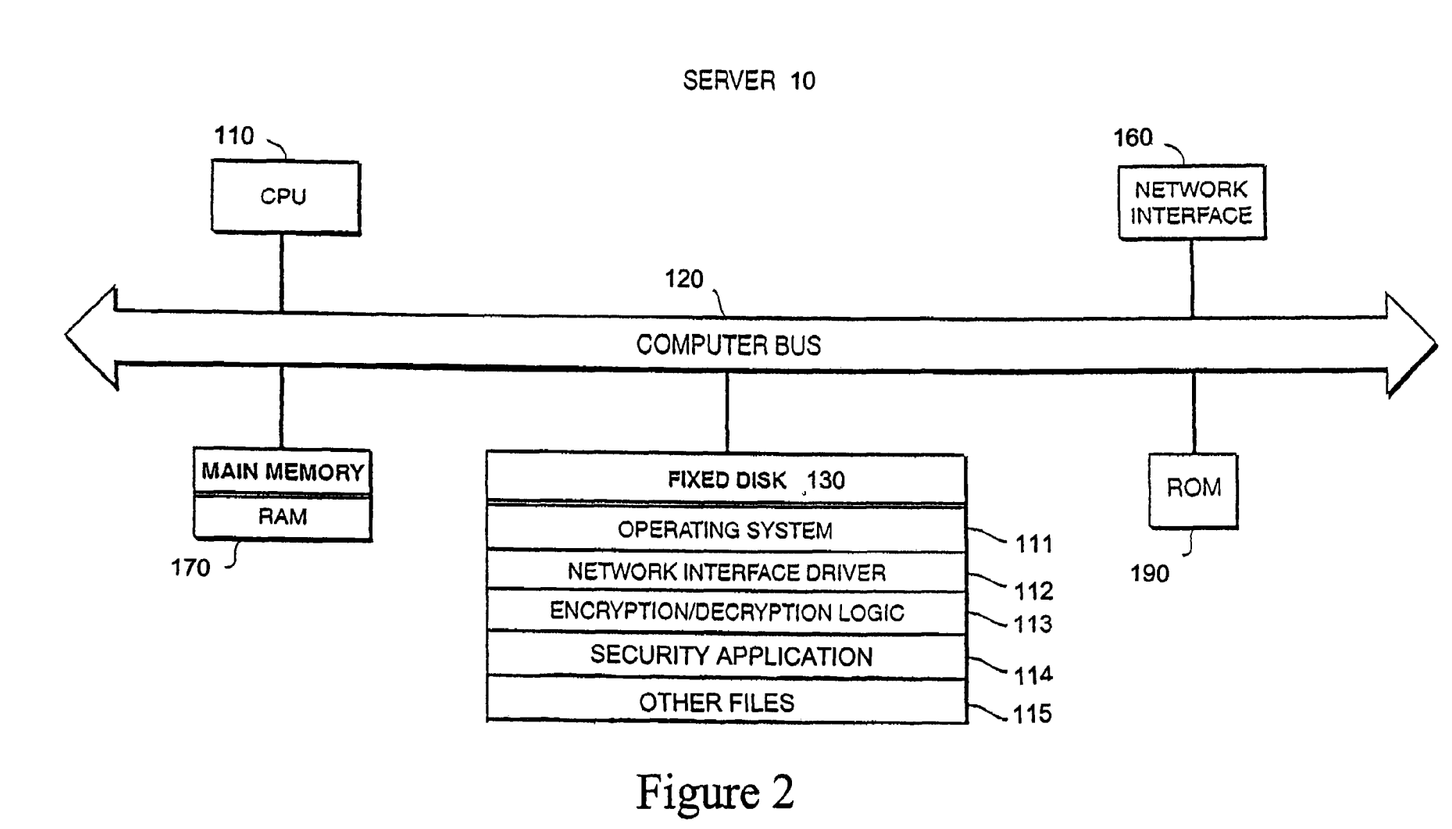
FIG. 2 is a block diagram depicting an internal architecture of a server.

Referring to FIG. 2, an internal architecture for a server, such as server 10 or server 30, is shown. While the following description of the server architecture is made with reference to server 10, the description applies equally to server 30. As seen in FIG. 2, server 10 is seen to include a central processing unit (CPU) 110 such as a programmable microprocessor which is interfaced to computer bus 120. Also coupled to computer bus 120 is a network interface 160 for interfacing to network 50. In addition, random access memory (RAM) 170, fixed disk 130, and read-only (ROM) 190 are also coupled to computer bus 120. RAM 170 interfaces to computer bus 120 to provide CPU 110 with access to memory storage, thereby acting as the main run-time memory for CPU 110. In particular, when executing stored program instruction sequences, CPU 110 loads those instruction sequences from fixed disk 130 (or other memory media) into RAM 170 and executes those stored program instruction sequences out of RAM 170. It should also be recognized that standard disk-swapping techniques allow segments of memory to be swapped to and from RAM 170 and fixed disk 120. ROM 190 stores invariant instruction sequences, such as start-up instruction sequences for CPU 110 or basic input/output operating system (BIOS) sequences for the operation of peripheral devices which may be attached to server 10 (not shown).

Fixed disk 130 is one example of a computer-readable medium that stores program instruction sequences executable by CPU 110. In server 10, the program instruction sequences may include operating system 111, network interface driver 112, encryption/decryption logic 113, security application 114, and other files 115. Operating system 111 can be an operating system such as Windows NT 4.0 (or later versions thereof), UNIX, Novell Netware or other such server operating systems. Network interface driver 112 is a hardware driver application utilized to drive network interface 160 for interfacing server 10 to network 50. Encryption/decryption logic 113 provides security functionality for server 10 to encrypt transmissions utilizing, for example, encryption keys, and provides functionality for decrypting received transmissions. Security application 114 is preferably a software application which provides the security functionality of the present invention. Specifically, as will be described in greater detail below, security application 114 provides functionality for generating security tokens (e.g., an encryption key or a keypair) and installation keys, associating a token with an installation key and storing them in association with one another, determining whether an installation key received by server 10 is stored therein, and if so, obtaining the token associated with the installation key and downloading it to a device. Security application 114 provides other security functionality, as will be described below, including functionality for certifying a security token and downloading a certificate to a device on the network. Other files 115 contains other files or programs necessary to operate server 10 and/or to provide additional functionality to server 10.

Figure 3:
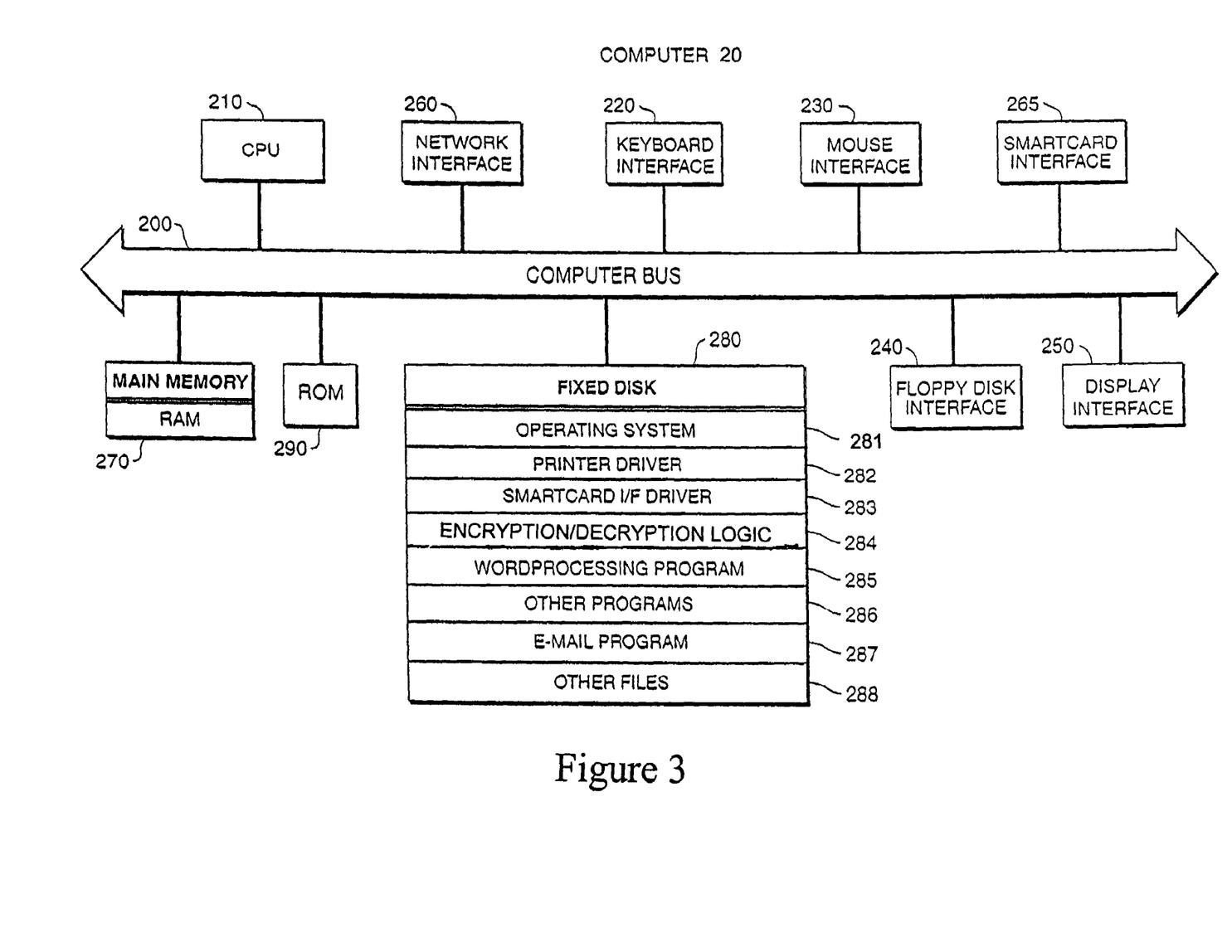
FIG. 3 is a block diagram depicting an internal architecture of a computer.

FIG. 3 depicts an internal architecture for personal computer (PC) 20. In FIG. 3, PC 20 is seen to include central processing unit (CPU) 210 such as a programmable microprocessor which is interfaced to computer bus 200. Also coupled to computer bus 200 are keyboard interface 220 for interfacing to a keyboard, mouse interface 230 for interfacing to a pointing device, floppy disk interface 240 for interfacing to a floppy disk, display interface 250 for interfacing to a display, network interface 260 for interfacing to network 50, and smart card interface 265 for interfacing to a smart card interface device (not shown).

Random access memory (RAM) 270 interfaces to computer bus 200 to provide CPU 210 with access to memory storage, thereby acting as the main run-time memory for CPU 210. In particular, when executing stored program instruction sequences, CPU 210 loads those instruction sequences from fixed disk 280 (or other memory media) into RAM 270 and executes those stored program instruction sequences out of RAM 270. It should also be noted that standard-disk swapping techniques available under windowing operating systems allow segments of memory to be swapped to and from RAM 270 and fixed disk 280. Read-only memory (ROM) 290 stores invariant instruction sequences, such as start-up instruction sequences for CPU 210 or basic input/output operation system (BIOS) sequences for the operation of peripheral devices attached to computer 10.

Fixed disk 280 is one example of a computer-readable medium that stores program instruction sequences executable by CPU 210 so as to constitute operating system 281, printer driver 282, smart card interface driver 283, encryption/decryption logic 284, word processing program 285, other programs 286, e-mail program 287 and other files 288. Operating system 281 is preferably a windowing operating system, such as Windows® 2000, or Windows® XP, although other types of operating systems may be used with the present invention. Printer driver 282 is utilized to prepare image data for printing on at least one image forming device, such as printers 22 and 24. Smart card interface driver 283 is utilized to drive and control smart card interface 265 for interfacing with a smart card interface device (not shown) so as to read and write to a smart card. Encryption/decryption logic 284 is preferably a security application that provides security functionality for PC 20 so as to encrypt/decrypt transmissions of PC 20.

Word processing program 285 is a typical word processor program for creating documents and images, such as Microsoft Word, or Corel WordPerfect documents. Other programs 286 contains other programs necessary to operate PC 20 and to run desired applications. E-mail program 287 is a typical e-mail program that allows PC 20 to receive and send e-mails over network 50. Other files 288 include any other files necessary for the operation of PC 20 or files created and/or maintained by other application programs on PC 20. For example, Internet browser application programs, such as Microsoft Internet Explorer or Netscape Navigator, may be included in other files 288.

Figure 4:
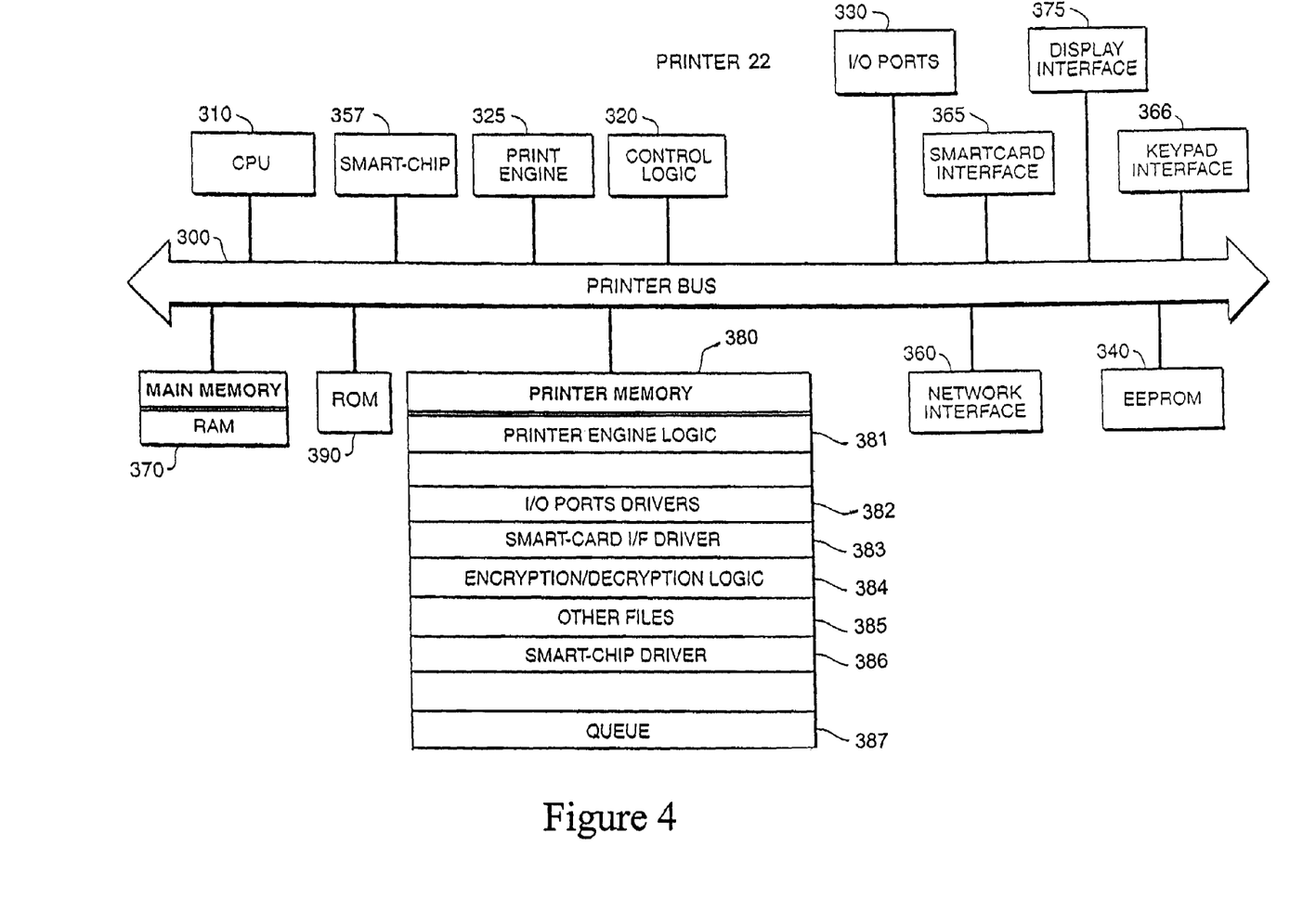
FIG. 4 is a block diagram depicting an internal architecture of a printer.

FIG. 4 depicts an example of an internal architecture for a printer, such as printers 22 and 24. In FIG. 4, printer 22 is seen to contain a printer smart-chip 357 which may be utilized in conjunction with smart-chip driver 383 for performing certain cryptographic operations. Printer 22 also contains a central processing unit (CPU) 310 such as a programmable microprocessor which is interfaced to printer bus 300. Also coupled to printer bus 300 are control logic 320, which is utilized to control printer engine 325 of printer 22, I/O ports 330 which is used to communicate with various input/output devices of printer 22 (not shown), smart card interface 365 which is utilized to interface with a smart card interface device (not shown), network interface 360 which is utilized to interface printer 22 to network 50, display interface 375 which interfaces to a display of the printer (not shown), and keypad interface 366 which interfaces to a keypad on printer 22.

Also coupled to printer bus 300 are EEPROM 340, for containing non-volatile program instructions, random access memory (RAM) 370, printer memory 380 and read-only memory (ROM) 390. RAM 370 interfaces to printer bus 300 to provide CPU 310 with access to memory storage, thereby acting as the main run-time memory for CPU 310. In particular, when executing stored program instruction sequences, CPU 310 loads those instruction sequences from printer memory 380 (or other memory media) into RAM 370 and executes those stored program instruction sequences out of RAM 370. ROM 390 stores invariant instruction sequences, such as start-up instruction sequences for CPU 310 or BIOS sequences for the operation of various peripheral devices of printer 22 (not shown).

Printer memory 380 is one example of a computer-readable medium that stores program instruction sequences executable by CPU 310 so as to constitute printer engine logic 381, I/O port drivers 382, smart card interface driver 383, encryption/decryption logic 384, other files 385, printer smart-chip driver 386, and queue 387. Printer engine logic 381 controls and drives printer engine 325 of printer 22 so as to print an image according to image data received by printer 22, preferably over network 50. I/O port drivers 382 are utilized to drive input and output devices such as a barcode scanner (not shown) connected through I/O ports 330. Smart card interface driver 383 is utilized to drive smart card interface 365 for interfacing to a smart card interface device (not shown), thereby enabling printer 20 to communicate with a smart card. Other files 385 contain other files and/or programs for the operation of printer 22. Printer smart-chip driver 386 is utilized to interface with printer smart-chip 357 for certain cryptographic operations.

The process of establishing mutual authentication and secure channels in devices without previous credentials according to the invention will now be described in more detail with regard to FIGS. 5 to 7. The process may be performed between, for example, server 10 and printer 22 so as to establish security credentials in printer 22. Briefly, according to one aspect of the invention, the process may comprise security application 114 in server 10 generating a security token (e.g., an encryption key or keypair) and an installation credential (referred to hereinafter as an "installation key" or "IK") and storing them in association with one another in server 10. Of course, security application 114 preferably generates multiple tokens, together with multiple installation keys for use by a plurality of devices on the network. Once the tokens and installation keys have been generated, the security application outputs the installation keys for use by a user. This process may be printing a barcode or alphanumeric code on a sheet of paper, or recording the credential as a key on a magnetic card, a smart card, a CD-ROM or some other type of recording medium. An output installation key corresponding to a particular device is provided to the user (e.g., purchaser or administrator) of the device, and once the user obtains the installation key, and the printer is ready for setup of the security credentials, the user inputs the installation key into the printer. The printer, utilizing its embedded encryption/decryption logic, uses the installation key as an encryption key to establish a temporary secure channel between the printer and server 10 and the printer submits a request to the server for provision of a security token (e.g., an encryption key, a keypair, security credentials, etc.). The server analyzes the request, including the received installation key, and determines whether a corresponding installation key is stored in the server. If so, a security token associated with the installation key is obtained and downloaded to the printer, using the installation key as an encryption key to provide a secure transmission of the security token to the printer. When the printer receives the security token, it performs a process to install the token in the printer. Thus, security credentials for the printer are established.

Figure 5:
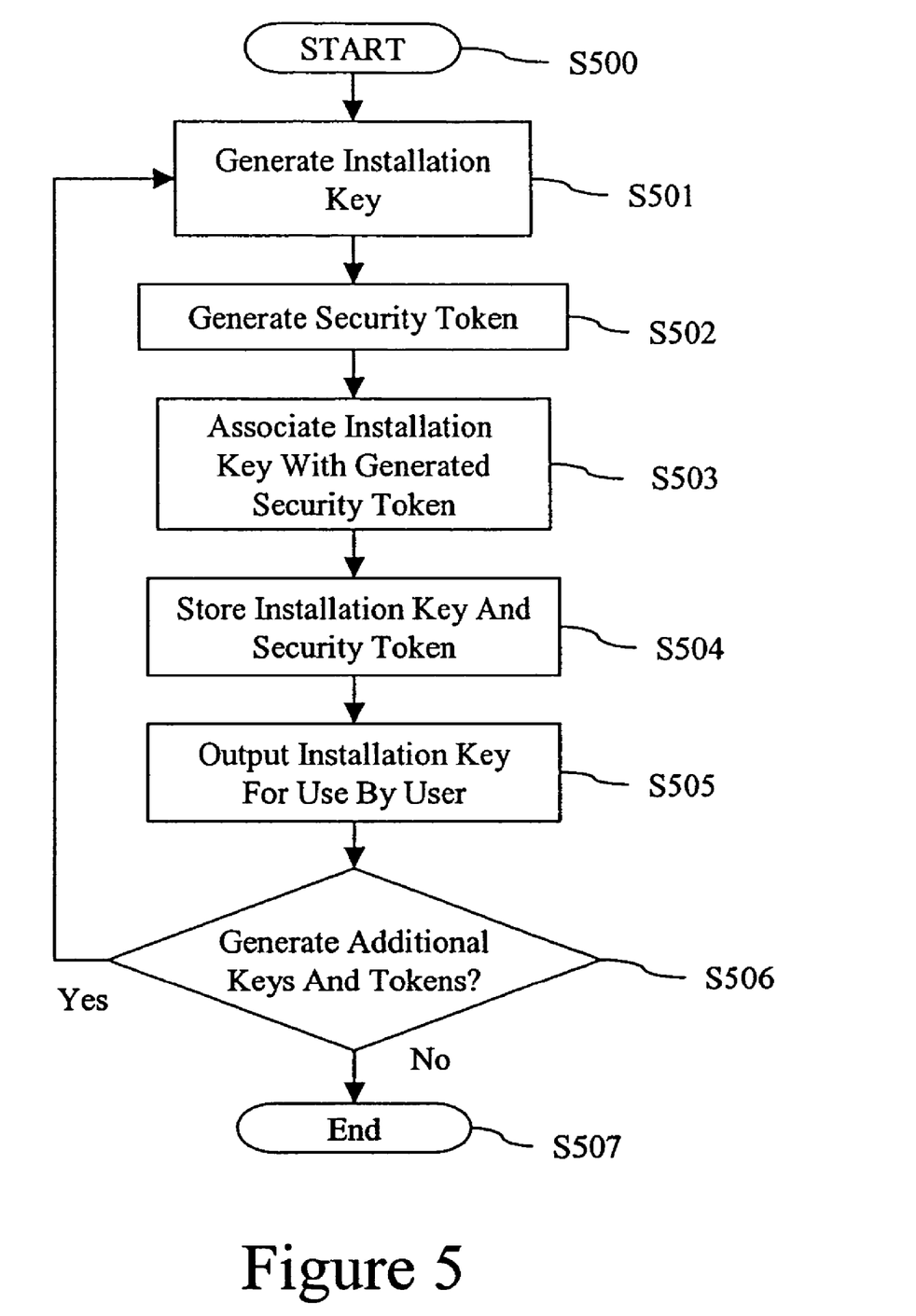
FIG. 5 is a flowchart of process steps for a server to generate security tokens and installation keys.

Referring now to FIG. 5, depicted therein is a flowchart of computer-executable process steps performed in server 10 by security application 114 to generate security tokens and installation keys. As shown in FIG. 5, the process is started in step S500, which may comprise an administrator at installation authority 15 starting security application 114 and selecting an operation to generate installation keys and security tokens. In step S501, an electronic installation key is generated by, for example, using a random number generator. In step S502, security application 114 also generates a security token. The security token may be any type of security token known in the art, such as a symmetric encryption key or an encryption keypair (e.g., private/public keypair for a PKI system), and any known technique for generating the security token can be utilized. In step S503, the installation key generated in step S501 and the security token generated in step S502 are associated with one another. For example, some type of a cross-reference between them may be provided in a look-up table. The installation key and the security token are then securely stored in the server (step S504). Then, a copy of the installation key is output for use by a user in step S505. By way of example, the installation key may be copied onto a magnetic strip of a credit card type card, or may be recorded onto a floppy disk, a CD-ROM, a smart card, or some other type of computer readable recording medium. Alternatively, the installation key may be converted into a machine readable format, such as a barcode or an alphanumeric code, with the barcode or alphanumeric code then being output in a hardcopy format (e.g., printed on a sheet of paper). As seen in step S506, a determination is made whether any additional installation keys or security tokens are to be generated, and if not, the process ends (step S507). If so, then flow returns to step S501. It should be noted that, while FIG. 5 depicts the generation of a single security token and a single installation key in one pass through the process steps, those skilled in the art should understand that multiple installation keys and multiple security tokens could be generated in steps S501 and S502 in one pass, and corresponding keys and tokens could be associated, stored and output in steps S503 to S505. However, for simplicity, the description has been made with regard to the generation of a single installation key and a single security token in one pass.

Figure 6A:
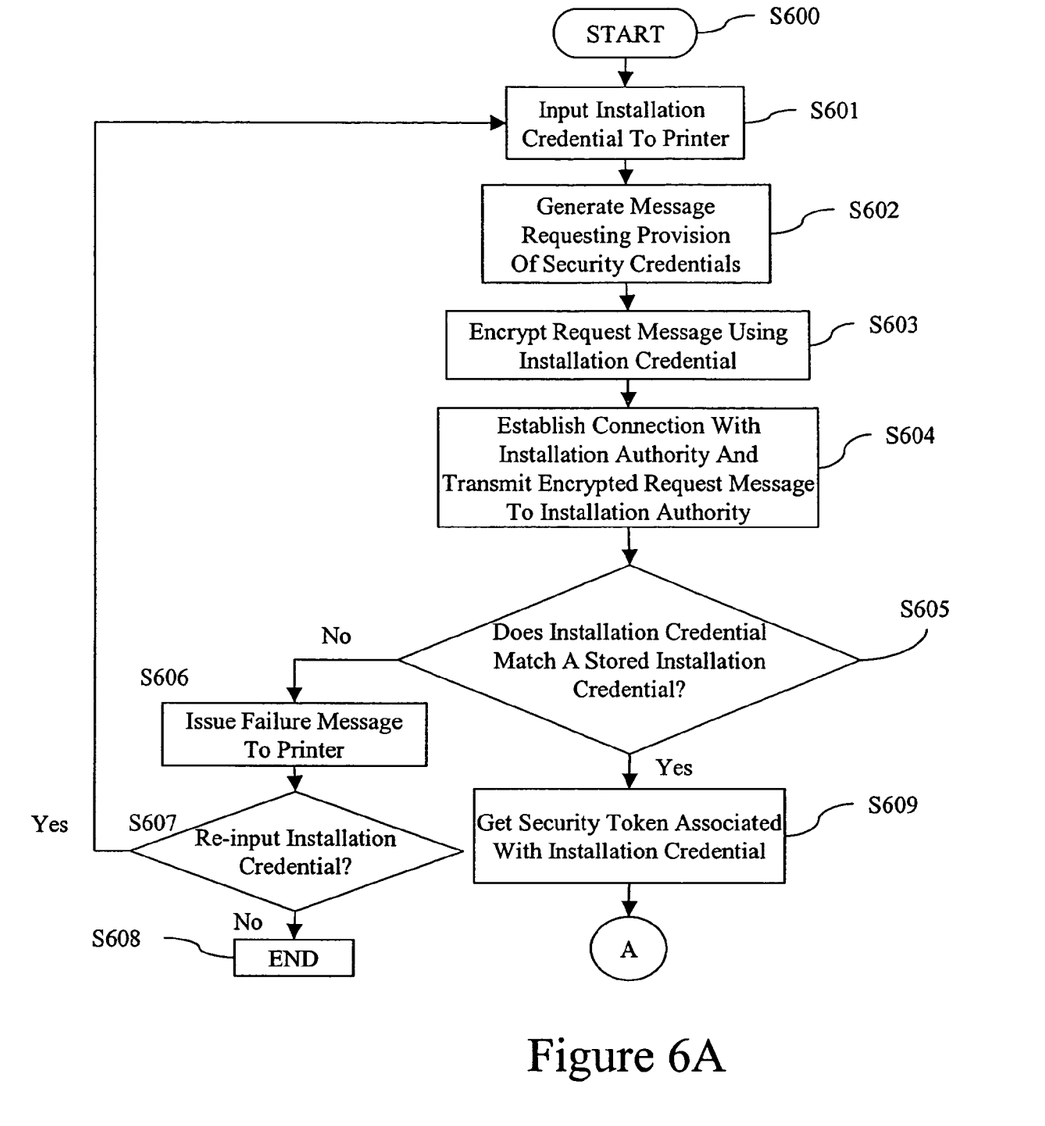
FIGS. 6A, 6B and 6C are flowcharts of process steps for installing a security token on a device according to one aspect of the invention.
Figure 6B:
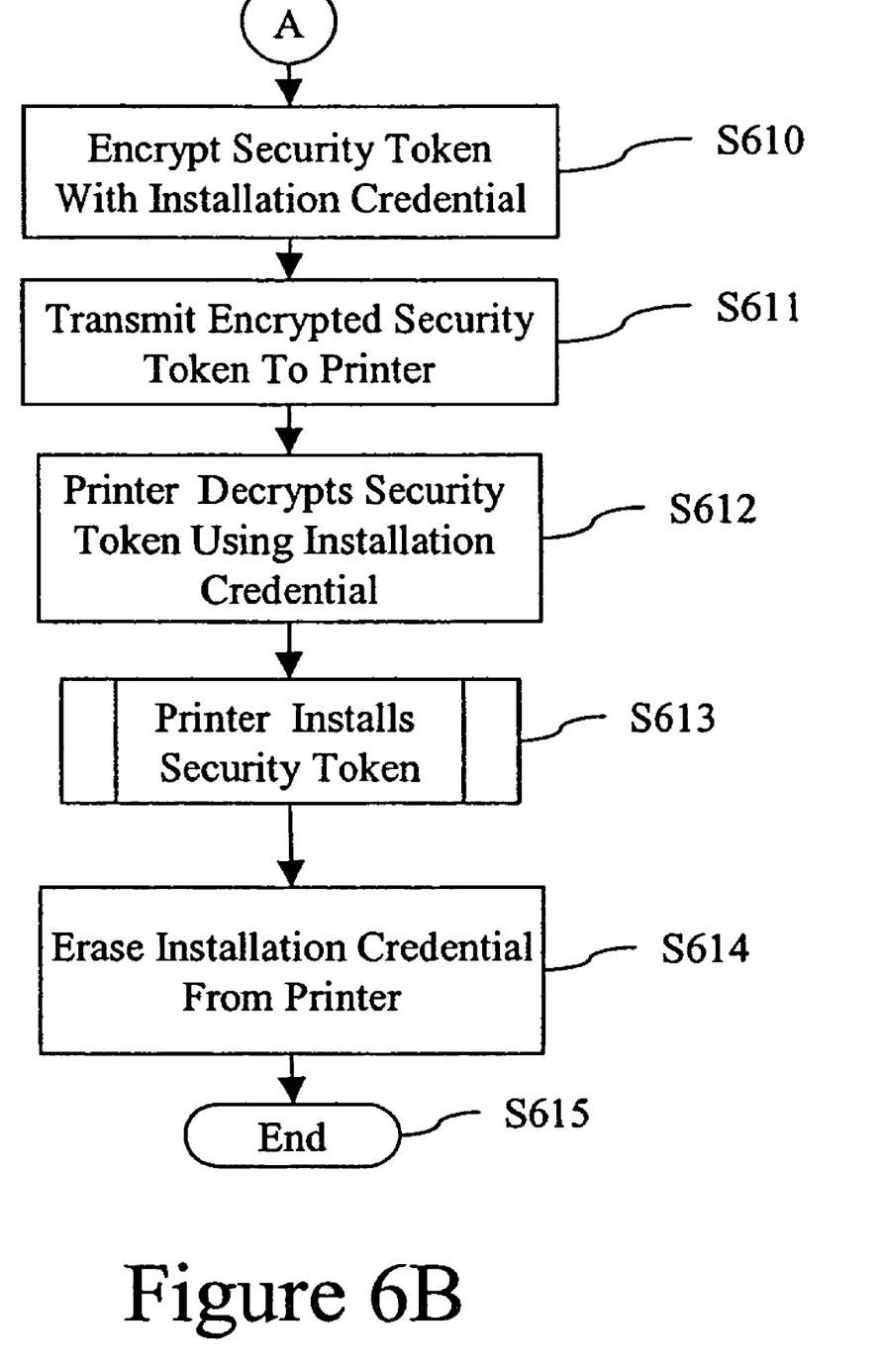
Figure 6C:
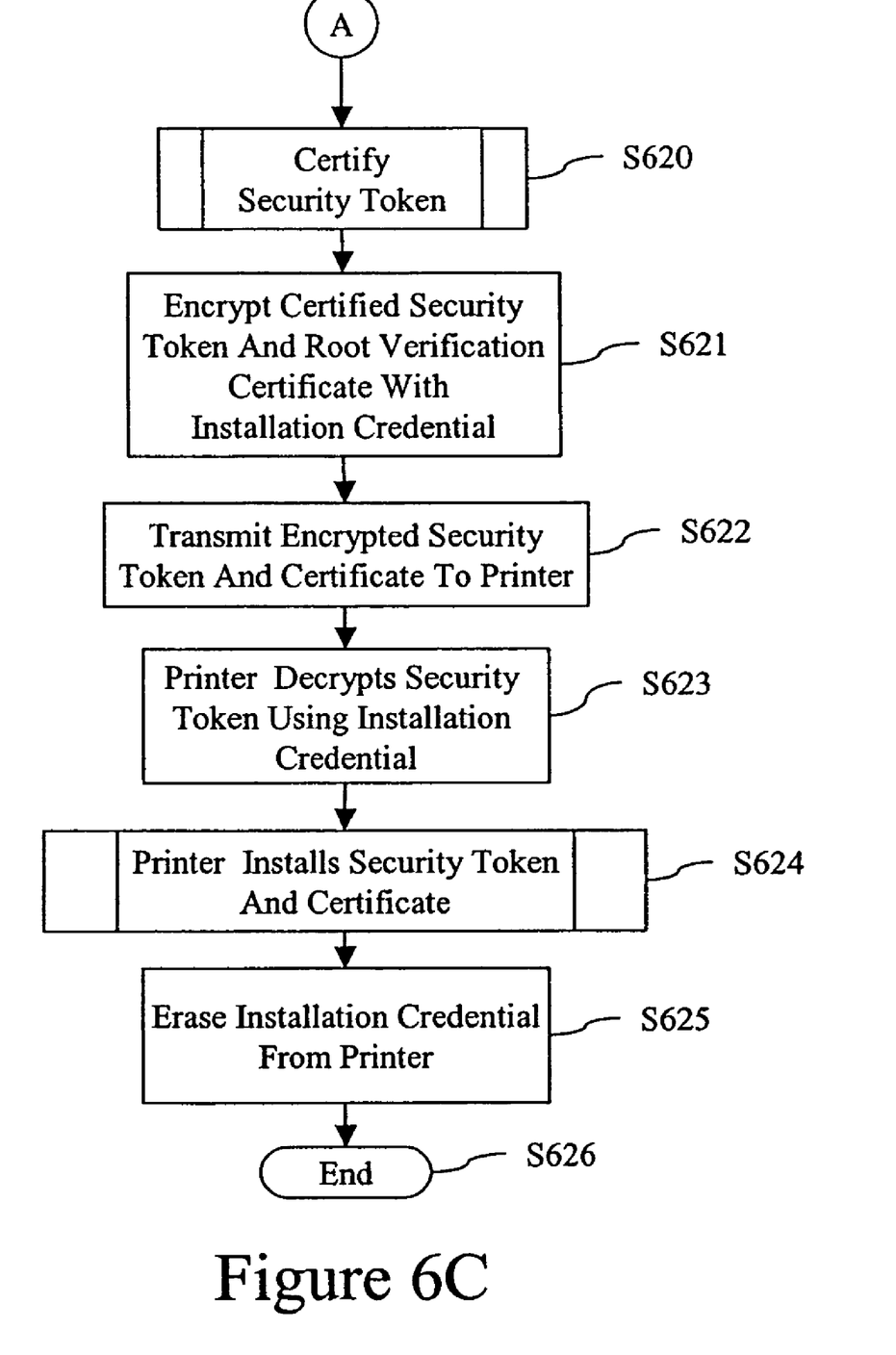

Referring now to FIGS. 6A, 6B and 6C, depicted therein are flowcharts of process steps for installing security credentials in a device, such as a printer, according to the invention. While the process steps will be described in terms of installing security credentials in a printer, it can readily be recognized that the process steps are not limited to use in connection with printers, but could be used to install credentials on virtually any type of device. It should also be noted that the process steps of FIGS. 6B and 6C are alternative embodiments of the continuation of the process depicted in FIG. 6A.

As seen in FIG. 6A, the installation process starts in step S600. The installation process can be initiated by, for example, a user or administrator being prompted, or selecting an option on a printer, to perform security setup. During the security setup process, the user may select an option to input the installation key, or they may be prompted to input the installation key (step S601) as part of the setup process. The user may then enter the installation key in any one of a number of ways, depending on the type of medium on which the installation key was issued by server 10. For instance, if the installation key was issued as an alphanumeric code printed on a sheet of paper, the user can input the code using, for example, a keypad on the printer. Alternatively, if the installation key is issued as a barcode printed on a sheet of paper, the user may simply scan the barcode using a scanner type input device connected to the printer. In a case where the installation key is recorded on a magnetic strip of a credit card type card, the user can swipe the card through a card reader attached to the printer. If the installation key is recorded on a floppy disk, CD-ROM, smart card, or some other type of recording medium, the user can input the recording medium into a reading device connected to the printer.

After having input the installation key, the printer generates a request message to be sent to server 10 to request provision of a security token to the printer (step S602). The message may comprise, for example, a GET message and may include identification information identifying the printer. In step S603, the printer, preferably utilizing its embedded encryption/decryption logic, uses the installation key as a symmetric encryption key to encrypt the message generated in step S602. The printer then establishes a connection with secure application 114 of server 10 and transmits the encrypted message to the server (step S604). The process then proceeds to the server side.

Upon receiving the encrypted message, secure application 114 of server 10 analyzes the message and the received installation key to determine whether a corresponding installation key is stored in the server (step S605). If a corresponding installation key is not found (No in step S605), then the server issues a failure message back to the printer (step S606). In this case, the printer may prompt the user to re-input the installation key, or may simply inform the user of the failure, whereby the user can reinitiate the installation process. Thus, if the user re-inputs the installation key (Yes in step S607), flow returns to step S601, but if the user does not re-input the installation key (No in step S607), then the installation process ends (step S608).

Returning to step S605, if a corresponding installation key is found (Yes in step S605), then the server refers to the association table to look-up the received installation key so as to determine which of the generated security tokens to obtain for downloading to the printer. The server then obtains the security token associated with the received installation key for downloading. It should be noted that, while not depicted in the process steps of FIG. 6A, the server may perform some authentication steps to authenticate the installation key and/or the printer before obtaining the associated security token. The authentication process would merely provide additional security measures to the installation process of the invention to ensure that the received installation key matches with the printer's identification information for which the installation key was issued. Once the security token is obtained in step S609, the process proceeds according to either of the alternative embodiments depicted in FIG. 6B or 6C. Thus, the process will first be described with regard to FIG. 6B.

As seen in step S610 of FIG. 6B, security application 114 in server 10 uses the installation key as a symmetric key to encrypt the security token, and then transmits the encrypted security token back to the printer (step S611). The printer, upon receiving the encrypted security token, decrypts the token using the input installation key as a decryption key (step S612) and then performs the necessary processing to install the security token in the printer (step S613). Any known process for installing encryption keys in a device may be utilized and the invention is not limited to any one process in particular. Once the security token has been installed, the printer erases the input installation key (step S614), and the printer is ready to perform secure communications over the network so the security setup process ends (step S615).

In an alternative arrangement depicted in FIG. 6C, additional steps may be performed by security application 114 before transmitting the security token to the printer. Thus, as seen in FIG. 6C, following the completion of step S609, security application 114 may perform a process to certify the security token (step S620). The certification process can be any known process for certifying security tokens and the invention is not limited to any particular type of process. For instance, the certification process may be one in which the security token is digitally signed by the security application or another certifying authority and a root verification certificate is generated for downloading to the printer. In such a case, the certified (e.g., signed) security token and the root verification certificate would be encrypted by the security application using the installation key as a symmetric key (step S621), with the encrypted certified token and certificate then being transmitted to the printer (step S622). Upon receiving the encrypted transmission, the printer decrypts the transmission using the input installation key as a decryption key (step S623) and performs a process to install the certified security token and the root verification certificate (step S624). Thus, upon successful completion of this process, the printer erases the input installation key (step S625), and the printer is ready to perform secure communications with other devices on the network, so the process ends (step S626).

The foregoing process describes the security token in general terms and the security token may be any type of device utilized for secure communications. For example, the security token may be a symmetric encryption key, or a private/public keypair that is used, for example, in a public key infrastructure (PKI), or any other type of security credentials. Of course, a private/public keypair need not form part of a PKI, but could simply constitute a private/public keypair specific to the printer. In a case where a private/public keypair constitutes the security token, those skilled in the art would readily recognize that the certification process of step S620 may comprise certifying the public key of the keypair, with the certified public key and the root verification certificate being transmitted to the printer for installation therein. It should also be noted that, while FIG. 6C depicts a certification process being performed in server 10 prior to downloading the security token to the printer, the process of FIG. 6B could be used instead, with the uncertified security token received by the printer being transmitted to a server for certification after receipt by the printer. While this is not a preferred implementation, such a process could nonetheless be performed along the lines of that described below with regard to FIG. 7.

Figure 7:
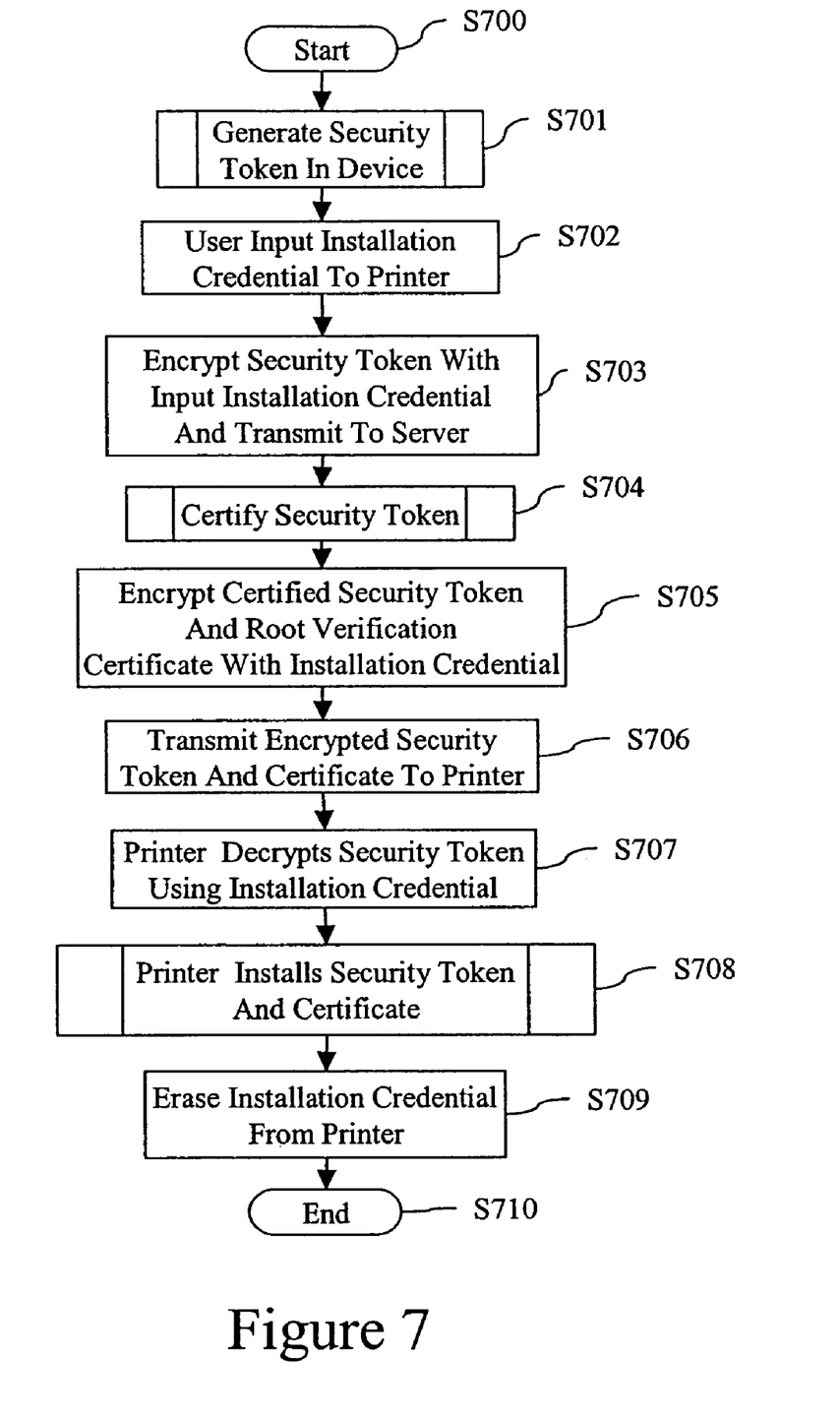
FIG. 7 is a flowchart of process steps for installing security credentials on a device in which the security token is internally generated.

FIG. 7 is a flowchart of process steps for a second aspect of the invention. In this second aspect, a security token is generated internally in the printer, but other devices on the network cannot recognize the security token until the credentials of the printer have been established with the other devices.

Therefore, in the aspect of FIG. 7, the printer utilizes the installation key as a way to establish a secure communication with an installation authority (e.g., server 10) for certifying the internally generated security token. In this regard, security application 114 would provide the necessary security related functionality (e.g., certification functionality). Certification of the token could also be obtained from an independent certifying authority (e.g., certifying server 30).

As seen in FIG. 7, the security setup process is started in step S700, similar to that described above. However, in the present aspect, upon commencement of the security setup process, the printer internally generates a security token (step S701). The generation of the security token in the printer can be accomplished in any one of a number of ways, including those described by at least some of the inventors herein in co-pending U.S. application Ser. No. 10/309,890 entitled "Encryption Key Generation In Embedded Devices", filed on Dec. 5, 2002, the contents of which are incorporated by reference as set forth in full herein. The user may then be prompted to input the installation key (step S702). This process can be similar to that described above with regard to step S601. Similar to the description provided above with regard to FIG. 5, the installation key may be generated by a security application in secure server 10. The generated installation key may then be stored in the server (albeit, without a corresponding security token), and the generated installation key may be output to the user for later use in setting up the printer's security credentials.

Once the user inputs the installation key, the printer encrypts the generated security token using the installation key as a symmetric key and transmits the encrypted security token to the secure server (step S703). In a case where the security token is a private/public keypair, the public key may be encrypted with the installation key and transmitted to the secure server. Upon receiving the encrypted security token, the installation server performs a process to certify the token, which may require additional communication with another certification server (step S704). This process is similar to that of step S620. After the security token has been certified, the certified token and (optionally) a root verification certificate of the certifying authority (e.g., server 10 or server 30) are encrypted using the installation key (step S705) and transmitted back to the printer (step S706). The printer uses the installation key to decrypt the received certified token (step S707), and then performs a process to install the certified token and the root verification certificate in the printer (step S708). Once the foregoing steps have been successfully completed, the printer erases the input installation key (step S709) and the security setup process is complete (step S710).

As can readily be seen from the foregoing aspect, although a printer may internally generate a security token, the printer still needs to establish its security credentials with other devices on the network in order to perform secure communications and this second aspect accomplishes the foregoing by utilizing the installation key as a means for establishing the security credentials.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A method for installing encryption keys on a printing device not having any previous security credentials, the method comprising the steps of:

by an installation authority server:

generating a security token to be used by the printing device for secure communications, and storing the generated security token for the printing device in the installation authority server;

generating an installation credential for the printing device, wherein the installation credential comprises one of a barcode or an alphanumeric code and is to be used by the printing device to obtain the security token from the installation authority server;

correlating, in a data base of the installation authority server, the installation credential generated for the printing device with the generated security token for the printing device; and generating a hardcopy format of the installation credential, wherein the hardcopy format of the installation credential is provided to a user of the printing device for an initial installation of the encryption keys in the printing device;

by the printing device:

accepting an input of the installation credential by the user of the printing device who inputs the installation credential into the printing device;

utilizing the input installation credential as a temporary security key for secure communications, the printing device establishing a temporary secure communication channel with the installation authority server;

generating a request message to be sent to the installation authority server for requesting that the installation authority server provide the generated security token to the printing device;

encrypting the generated request message using the installation credential; and transmitting the encrypted request message to the installation authority server over the established temporary secure communication channel, by the installation authority server:

receiving the request message encrypted with the installation credential from the printing device via the established temporary secure communication channel;

decrypting the request message and performing an authentication process to authenticate the printing device after having received the request message for provision of the security token;

in a case where the printing device is authenticated, obtaining the security token of the printing device correlated in the database with the installation credential;

encrypting the obtained security token of the printing device using the installation credential; and transmitting the encrypted security token of the printing device to the printing device over the established temporary secure communication channel; and by the printing device:

receiving the encrypted security token transmitted by the installation authority server;

decrypting the security token using the installation credential input into the printing device by the user;

performing an installation process to install the security token on the printing device; and after having completed the installation process, erasing the installation credential from the printing device.

2. A method according to claim 1, wherein the security token comprises one of an encryption key or an encryption keypair.

3. A method according to claim 2, wherein, in a case where the security token is an encryption keypair, the installation authority server further performing the steps of:
   certifying a public key of the keypair; and
   providing the certified public key and a root verification certificate of the installation authority server to the printing device.

4. A method of establishing security credentials for a printing device not having any previous security credentials, the method comprising the steps of:
   by the printing device,
      generating a security token to be used by the printing device for secure communications; and
      storing the generated security token in the printing device,
   by an installation authority server:
      generating an installation credential for the printing device, wherein the installation credential comprises one of a barcode and an alphanumeric code;
      storing the installation credential in a database of the installation authority server in correlation with identification information of the printing device; and
      generating a hardcopy format of the installation credential, wherein the hardcopy format of the installation credential is provided to a user of the printing device,
   by the printing device:
      accepting an input of the installation credential by the user of the printing device who inputs the installation credential into the printing device;
      establishing a temporary secure communication channel with the installation authority server utilizing the installation credential as a temporary security key;
      encrypting the generated security token of the printing device utilizing the input installation credential; and
      transmitting the encrypted security token to the installation authority via the temporary secure communication channel for the installation authority server to certify the security token;
   by the installation authority server:
      receiving the encrypted security token transmitted by the printing device; and
      decrypting the security token using the installation credential stored in the database;
      performing a process to certify the security token; and
      providing a certified security token and a root verification certificate of the installation authority server to the printing device, and
   by the printing device:
      installing the certified security token and the root verification certificate in the printing device; and
      terminating the temporary secure communication channel and erasing the installation credential from the printing device.

5. A method according to claim 4, wherein the security token comprises one of an encryption key or an encryption keypair.

6. A method according to claim 5, wherein, in a case where the security token is an encryption keypair, a public key of the keypair is provided by the printing device to the installation authority server.

7. A computer-readable non-transitory storage medium on which is stored a computer-readable program for executing a method for installing encryption keys on a printing device not having any previous security credentials, the program comprising the steps of:
   by an installation authority server:
      generating a security token to be used by the printing device for secure communications, and storing the generated security token for the printing device in the installation authority server;
      generating an installation credential for the printing device, wherein the installation credential comprises one of a barcode or an alphanumeric code and is to be used by the printing device to obtain the security token from the installation authority server;
      correlating, in a database of the installation authority server, the installation credential generated for the printing device with the generated security token for the printing device; and
      generating a hardcopy format of the installation credential, wherein the hardcopy format of the installation credential is provided to a user of the printing device for an initial installation of the encryption keys in the printing device,
   by the printing device:
      accepting an input of the installation credential by the user of the printing device who inputs the installation credential into the printing device;
      utilizing the input installation credential as a temporary security key for secure communications, the printing device establishing a temporary secure communication channel with the installation authority server and;
      generating a request message to be sent to the installation authority server for requesting that the installation authority server provide the generated security token to the printing device;
      encrypting the generated request message using the installation credential; and
      transmitting the encrypted request message to the installation authority server over the established temporary secure communication channel,
   by the installation authority server:
      receiving the request message encrypted with the installation credential from the printing device via the established temporary secure communication channel;
      decrypting the request message and performing an authentication process to authenticate the printing device after having received the request for provision of the security token;
      in a case where the printing device is authenticated, obtaining the security token of the printing device correlated in the database with the installation credential;
      encrypting the obtained security token of the printing device using the installation credential; and
      transmitting the encrypted security token of the printing device to the printing device over the established temporary secure communication channel; and
   by the printing device:
      receiving the encrypted security token transmitted by the installation authority server;
      decrypting the security token using the installation credential input into the printing device by the user;
      performing an installation process to install the security token on the printing device; and
      after having completed the installation process, erasing the installation credential from the printing device.

8. A computer-readable non-transitory storage medium on which is stored a computer-readable program for executing a method of establishing security credentials for a printing device not having any previous security credentials, the program comprising the steps of:

by the printing device,
generating a security token to be used by the printing device for secure communications; and
storing the generated security token in the printing device,
by an installation authority server:
generating an installation credential for the printing device, wherein the installation credential comprises one of a barcode and an alphanumeric code;
storing the installation credential in a database of the installation authority server in correlation with identification information of the printing device; and
generating a hardcopy format of the installation credential, wherein the hardcopy format of the installation credential is provided to a user of the printing device,
by the printing device:
accepting an input of the installation credential by the user of the printing device who inputs the installation credential into the printing device;
establishing a temporary secure communication channel with the installation authority server utilizing the installation credential as a temporary security key;
encrypting the security token of the printing device utilizing the input installation credential; and
transmitting the encrypted security token to the installation authority via the temporary secure communication channel for the installation authority server to certify the security token,
by the installation authority server:
receiving the encrypted security token transmitted by the printing device;
decrypting the security token using the installation credential stored in the database;
performing a process to certify the security token; and
providing a certified security token and a root verification certificate of the installation authority server to the printing device, and
by the printing device:
installing the certified security token and the root verification certificate in the printing device; and
terminating the temporary secure communication channel and erasing the installation credential from the printing device.

9. A system for installing encryption keys on a printing device not having any previous security credentials, comprising:
an installation authority server, comprising:
a security token generator that generates a security token to be used by the printing device for secure communications;
an installation credential generator that generates an installation credential for the printing device, wherein the installation credential comprises one of a barcode or an alphanumeric code and is to be used by the printing device to obtain the security token from the installation authority server;
a storage unit that stores the security token generated for the printing device and the installation credential generated for the printing device in a database, wherein the installation credential and security token are stored in the database in correlation with one another;
a hardcopy format generator that generates a hardcopy format of the installation credential, the generated hardcopy format being provided to a user of the printing device for an initial installation of the encryption keys in the printing device,
the printing device, comprising:
an input unit for accepting an input of the installation credential by the user of the printing device who inputs the installation credential into the printing device;
a secure communication unit that establishes a temporary secure communication channel with the installation authority server utilizing the input installation credential as a temporary security key;
a security token requesting unit that generates a request message to be sent to the installation authority server for requesting that the installation authority server provide the generated security token to the printing device via the established temporary secure communication channel;
a message encryption unit that encrypts the generated request message using the input installation credential; and
a transmitting unit that transmits the encrypted request message to the installation authority server over the established temporary secure communication channel,
wherein the installation authority server further comprises:
an installation credential a receiving unit that receives the request message encrypted with the installation credential from the printing device via the established temporary secure communication channel;
a decryption unit that decrypts the received request message;
an authentication unit that performs an authentication process to authenticate the printing device after having received the request for provision of the security token;
an obtaining unit that, in a case where the printing device is authenticated, obtains the security token of the printing device correlated in the database with the installation credential;
an encryption unit that encrypts the obtained security token of the printing device using the installation credential; and
a transmitting unit that transmits the encrypted security token of the printing device to the printing device over the established temporary secure communication channel,
and wherein the printing device further comprises:
a receiving unit that receives the encrypted security token transmitted by the installation authority server;
a decryption unit that decrypts the security token using the installation credential input into the printing device by the user;
an installation unit that installs the received security token on the printing device; and
an erasing unit that, after the installation unit installs the security token, erases the input installation credential from the printing device.

10. A system according to claim 9, wherein the security token comprises one of an encryption key or an encryption keypair.

11. A system according to claim 10, wherein the installation authority server further comprises:
certifying unit that certifies the security token,
wherein the providing unit further provides the certified security token and a root verification certificate of the installation authority server to the printing device.

12. A system for establishing security credentials for a printing device not having any previous security credentials, comprising:
an installation authority server, comprising:

an installation credential generator that generates an installation credential for the printing device, wherein the installation credential comprises one of a barcode or an alphanumeric code;

a storing unit that stores, in a database, the installation credential in correlation with identification information of the printing device; and a hardcopy format generator that generates a hardcopy format of the installation credential, wherein the hardcopy format of the installation credential is provided to a user of the printing device, and the printing device, comprising:

a security token generator that generates a security token to be used by the printing device for secure communications;

a storing unit for storing the generated security token in the printing device;

an input unit for accepting an input of the installation credential by the user of the printing device who inputs the installation credential into the printing device;

a secure communication unit that establishes a temporary secure communication channel with the installation authority server utilizing the input installation credential as a temporary security key;

an encryption unit that encrypts the generated security token utilizing the input installation credential; and a security token transmitting unit that transmits the encrypted security token to the installation authority server via the established temporary secure communication channel, wherein the installation authority server further comprises:

a receiving unit that receives the encrypted security token transmitted by the transmitting unit of the printing device;

a decryption unit that decrypts the security token using the installation credential stored in the database;

a certifying unit that performs a certification process to certify the security token; and a transmitting unit that transmits a certified security token and a root verification certificate of the installation authority server to the printing device, and wherein the printing device further comprises:

an installation unit that installs the certified security token and the root verification certificate in the printing device; and an erasing unit that erases the input installation credential from the printing device.

\* \* \* \* \*